US009473955B2

(12) United States Patent
Liu et al.

(10) Patent No.: US 9,473,955 B2
(45) Date of Patent: Oct. 18, 2016

(54) METHOD AND BASE STATION FOR POWER DETERMINATION

(71) Applicant: Huawei Technologies Co., Ltd., Shenzhen, Guangdong (CN)

(72) Inventors: Yalin Liu, Shenzhen (CN); Zhikun Xu, Shenzhen (CN); Shunqing Zhang, Shenzhen (CN); Yan Chen, Shenzhen (CN); Shugong Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 331 days.

(21) Appl. No.: 14/165,310

(22) Filed: Jan. 27, 2014

(65) Prior Publication Data

US 2014/0140238 A1 May 22, 2014

Related U.S. Application Data

(63) Continuation of application No. PCT/CN2012/079368, filed on Jul. 30, 2012.

(30) Foreign Application Priority Data

Jul. 29, 2011 (CN) .......................... 2011 1 0215626

(51) Int. Cl.
G01R 31/08 (2006.01)
H04W 24/02 (2009.01)
(Continued)

(52) U.S. Cl.
CPC ......... H04W 24/02 (2013.01); H04W 52/0206 (2013.01); H04W 52/0209 (2013.01); H04W 52/267 (2013.01); H04W 52/143 (2013.01); H04W 52/343 (2013.01); Y02B 60/50 (2013.01)

(58) Field of Classification Search
USPC ................................... 370/252; 455/522, 69
See application file for complete search history.

(56) References Cited

U.S. PATENT DOCUMENTS 7,096,034 B2 * 8/2006 Zhang et al. ............ H04B 7/00
455/522
2006/0094372 A1 * 5/2006 Ahn ....................... H04L 1/0003
455/67.13
(Continued)

FOREIGN PATENT DOCUMENTS

CN 101193441 A 6/2008
CN 101489298 A 7/2009
(Continued)

OTHER PUBLICATIONS

Ho et al., "Optimal Resource Allocation for Multiuser MIMO-OFDM Systems With User Rate Constraints," IEEE Transactions on Vehicular Technology, vol. 58, No. 3, pp. 1190-1203, IEEE, New York, New York (Mar. 2009).
(Continued)

Primary Examiner — Phuongchau Ba Nguyen
(74) Attorney, Agent, or Firm — Leydig, Voit & Mayer, Ltd.

(57) ABSTRACT

The present invention provides a method and a base station for power determination. The method comprises obtaining an optimal number of sub-carriers occupied by each user equipment, an optimal number of radio frequency links enabled by a base station and an optimal transmitting power of the base station by optimizing the number of the sub-carriers occupied by each user equipment, the number of the radio frequency links enabled by the base station and the transmitting power of the base station with an optimization condition that throughput of each user equipment is not smaller than a throughput threshold and an optimization goal of minimizing total power consumption of the base station; and determining the total power consumption of the base station according to the optimal number of the sub-carriers occupied by each user equipment, the optimal number of the radio frequency links enabled by the base station.

12 Claims, 4 Drawing Sheets

(51) Int. Cl.
*H04W 52/02* (2009.01)
*H04W 52/26* (2009.01)
*H04W 52/14* (2009.01)
*H04W 52/34* (2009.01)

(56) References Cited

U.S. PATENT DOCUMENTS

| | | | |
|---|---|---|---|
| 2006/0153309 A1* | 7/2006 | Tang | H04L 27/2608 375/260 |
| 2008/0181095 A1* | 7/2008 | Zangi | H04B 7/0845 370/208 |
| 2008/0219364 A1 | 9/2008 | Hui et al. | |
| 2008/0299983 A1* | 12/2008 | Kwak | H04L 27/261 455/446 |
| 2009/0047987 A1* | 2/2009 | Li | H04W 72/1257 455/522 |
| 2010/0035645 A1* | 2/2010 | Chang | H04W 52/146 455/522 |
| 2010/0098184 A1 | 4/2010 | Ryoo et al. | |
| 2010/0103828 A1* | 4/2010 | Kuroda | H04L 1/0003 370/252 |
| 2010/0202431 A1 | 8/2010 | Kazmi et al. | |
| 2010/0284449 A1 | 11/2010 | De Veciana et al. | |
| 2011/0077059 A1 | 3/2011 | Kim et al. | |
| 2014/0140238 A1* | 5/2014 | Liu | H04W 24/02 370/252 |

FOREIGN PATENT DOCUMENTS

| | | |
|---|---|---|
| CN | 101689907 A | 3/2010 |
| CN | 101742624 A | 6/2010 |
| CN | 102098769 A | 6/2011 |

OTHER PUBLICATIONS

Yu et al., "Adaptive FR Chain Management for Energy-Efficient Spatial-Multiplexing MIMO Transmission," International Journal of Computer Trends and Technology, vol. 5, No. 2, pp. 401-406 (Nov. 2013).

* cited by examiner

METHOD AND BASE STATION FOR POWER DETERMINATION

CROSS-REFERENCE TO RELATED APPLICATIONS

This application is a continuation of International Patent Application No. PCT/CN2012/079368, filed on Jul. 30, 2012, which claims priority to Chinese Patent Application No. 201110215626.0, filed on Jul. 29, 2011, both of which are hereby incorporated by reference in their entireties.

FIELD OF THE INVENTION

Embodiments of the present invention relate to wireless communication technology, and more particularly, to a method and a base station for power determination.

BACKGROUND OF THE INVENTION

Energy consumption of wireless communication industry is increasing with improvement on communication data rate and quality, and high energy consumption will become a constraint for future development of the communication industry no matter from a perspective of environmental protection or manufacturing cost of a communication device, so a design of an efficient and energy-saving communication system has already become an important direction of future communication development.

Multiple input multiple output (Multiple input multiple output; MIMO for short) technology has already been widely applied to communication systems of present stage and next generation due to characteristic of high spectral efficiency. Orthogonal Frequency Division Multiplexing (Orthogonal Frequency Division Multiplexing; OFDM for short) technology has already become a main access technology of next generation communication system standards due to high-frequency spectrum efficiency. Because the OFDM technology can convert a traditional multipath interference channel into a frequency domain non-interference parallel channel, the combination of the OFDM technology and the MOMI technology will become mainstream of the communication system in the future. In energy consumption of a downlink MIMO-OFDM system, power consumption of a base station occupies a great proportion, so minimization of the total power consumed by the base station makes a big contribution to constructing the efficient and energy-saving communication system under the condition that user equipment requirements for communication data rate is met.

In the prior art, there is a method in which the minimum multiplexing gain in the MIMO mode is calculated to judge whether there is a MIMO mode which is more energy-saving than a single input single output (Single input single output; SISO for short) mode, the optimal MIMO transmission mode is selected according to a certain criterion, and the power of a base station is saved through mode switch. However, a switch between the MIMO mode and the SISO mode is only suitable for point-to-point transmission, and the switch mode cannot realize radio frequency link switching under the condition of meeting demands of multiple user equipments in a multi-user equipment downlink MIMO-OFDM system.

To the above problem, a prior art proposes a solution for realizing energy saving of a base station by controlling the number of enabled radio frequency links and the number of occupied frequency resource blocks (Resource Block; RB for short) in the downlink MIMO-OFDM system according to service traffic. In the technical solution, when service load is lower than a reference threshold, the system schedules a part of the total frequency resources not to be occupied, then disables a part of the radio frequency links according to the occupation condition of the frequency resource blocks, and finally adjusts transmitting power of the enabled radio frequency link to ensure that a whole power spectral value is unchanged.

In the technical solution, a specific design method of the service reference threshold is not given, and the relation between the occupation condition of the frequency resource blocks and the disabled radio frequency link is also not specifically given, that is to say, the technical solution does not solve the problem on the minimization of the total power consumed by the base station in the downlink MIMO-OFDM system.

SUMMARY OF THE INVENTION

The embodiments of the present invention provide a method and a base station for power determination to minimize the total power consumption of the base station in a downlink MIMO-OFDM system, to reduce the energy consumption of the downlink MIMO-OFDM system.

A method for power determination is provided in the embodiments of the present invention, including:

obtaining an optimal number of sub-carriers occupied by each user equipment, an optimal number of radio frequency links enabled by a base station and an optimal transmitting power of the base station by optimizing the number of the sub-carriers occupied by each user equipment, the number of the radio frequency links enabled by the base station and the transmitting power of the base station with an optimization condition that throughput of each user equipment is not smaller than a throughput threshold and an optimization goal of minimizing total power consumption of the base station; and determining the total power consumption of the base station according to the optimal number of the sub-carriers occupied by each user equipment, the optimal number of the radio frequency links enabled by the base station and the optimal transmitting power of the base station obtained by optimization.

A base station is provided in the embodiments of the present invention, including:

an obtaining module, configured to obtain an optimal number of sub-carriers occupied by each user equipment, an optimal number of radio frequency links enabled by a base station and an optimal transmitting power of the base station by optimizing the number of the sub-carriers occupied by each user equipment, the number of the radio frequency links enabled by the base station and the transmitting power of the base station with an optimization condition that throughput of each user equipment is not smaller than a throughput threshold and an optimization goal of minimizing total power consumption of the base station;

a determining module, configured to determine the total power consumption of the base station according to the optimal number of the sub-carriers occupied by each user equipment, the optimal number of the radio frequency links enabled by the base station and the optimal transmitting power of the base station obtained by optimization.

The method and the base station for power determination provided by the embodiments of the present invention perform joint optimization of the number of the sub-carriers occupied by each user equipment, the number of the radio frequency links enabled by the base station and the transmitting power of the base station with the optimization condition that throughput of each user equipment is not smaller than a throughput threshold and an optimization goal of minimizing total power consumption of the base station to obtain the optimal number of sub-carriers occupied by each user equipment, the optimal number of radio frequency links enabled by the base station and an optimal transmitting power of the base station, which minimizes the total power consumption of the base station determined by the optimal number of the sub-carriers occupied by each user equipment, the optimal number of the radio frequency links enabled by the base station and the optimal transmitting power of the base station, and thus reduces the energy consumption of the downlink MIMO-OFDM system.

BRIEF DESCRIPTION OF THE DRAWINGS

To illustrate technical solutions of the embodiments of the present invention or the related art more clearly, a brief introduction on the accompanying drawings necessary in the description of the embodiments or the related art is given below. Apparently, the accompanying drawings described below are merely some embodiments of the present invention, based on which other drawings can be obtained by those skilled in the art without any inventive efforts.

EMBODIMENTS OF THE INVENTION

In order to make objectives, technical solutions and advantages of the embodiments of the present invention more clearly, a clear and complete description of technical solutions of the embodiments of the present invention will be given below, in combination with the accompanying drawings in the embodiments of the present invention. Apparently, the embodiments described below are merely a part, but not all, of the embodiments of the present invention. All of other embodiments, obtained by those skilled in the art based on the embodiments of the present invention without any inventive efforts, fall into the protection scope of the present invention.

Figure 1:
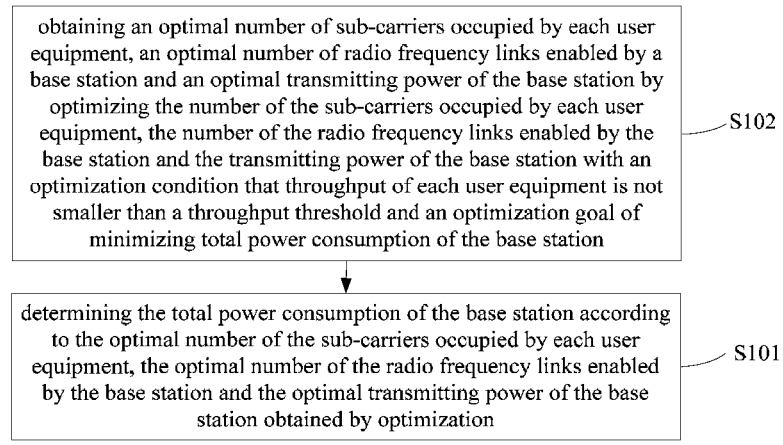
FIG. 1 is a flowchart of a method for power determination provided by an embodiment of the present invention.

FIG. 1 is a flowchart of a method for power determination provided by an embodiment of the present invention. As shown in FIG. 1, the method of the embodiment, including:

Step 101, obtaining an optimal number of sub-carriers occupied by each user equipment, an optimal number of radio frequency links enabled by a base station and an optimal transmitting power of the base station by optimizing the number of the sub-carriers occupied by each user equipment, the number of the radio frequency links enabled by the base station and the transmitting power of the base station with an optimization condition that throughput of each user equipment is not smaller than a throughput threshold and an optimization goal of minimizing total power consumption of the base station.

A downlink MIMO-OFDM system brings high spectral efficiency, meanwhile the MIMO technology which needs multiple radio frequency links also brings additional circuit energy consumption, and this part of circuit energy consumption occupies a considerable proportion of the total energy consumption of the downlink MIMO-OFDM system. Therefore, the energy consumption of the downlink MIMO-OFDM system can be effectively reduced by reducing the total power consumption of the base station. The radio frequency power consumption of the base station mainly consists two parts, one is transmitting power consumption for transmitting data, and the other is circuit power consumption of the radio frequency links, wherein the transmitting power consumption for transmitting data is shown in formula (1).

$$P_d = P_t/\rho + mP_{fix} \tag{1}$$

where $P_d$ indicates the transmitting power consumption for transmitting data; $P_t$ indicates the transmitting power of the base station, that is, power radiated to wireless space; $\rho$ indicates conversion efficiency of a power amplifier of the base station; m indicates the number of radio frequency links enabled by the base station; and $P_{fix}$ indicates fixed power consumption of a power amplifier in each radio frequency link.

The total power consumption of the base station is shown in formula (2).

$$P_{tot} = P_t/\rho + mP_{fix} + mP_c = P_t/\rho + mP_{rf} \tag{2}$$

where $P_{tot}$ indicates the total power consumption of the base station; $P_c$ indicates fixed energy consumption of other part of each radio frequency link; and $P_{rf} = P_c + P_{fix}$ indicates the circuit power consumption of each radio frequency link.

It can be seen from the above formula that the total power consumption of the base station is affected by the number of the enabled radio frequency links and the transmitting power of the base station. Multiple radio frequency links of the base station are shared by multiple user equipments, and the number of the radio frequency links enabled by the base station is codetermined by performances of the multiple user equipments. In addition, how to assign frequency domain resources (that is sub-carriers) is also a main factor for affecting the number of the radio frequency links enabled by the base station, and affects the total power consumption of the base station.

Low power consumption is realized on the premise of meeting throughput (or data rate) requirements of user equipments. The $i^{th}$ user equipment in the downlink MIMO-OFDM system is taken as an example, and the throughput of the $i^{th}$ user equipment is shown in formula (3).

$$C_i = \Delta f k_i D \log_2\left(1 + \frac{\mu_i m N P_t}{K D^2 \sigma^2}\right) \tag{3}$$

where $C_i$ indicates the throughput of the $i^{th}$ user equipment; $\Delta f$ indicates bandwidth of each sub-carrier; $k_i$ indicates the number of sub-carriers occupied by the $i^{th}$ user equipment; $i=1, 2, \ldots, I$, I indicates the total number of user equipments; K indicates the total number of sub-carriers; $\mu_i$ indicates large-scale channel gain of the $i^{th}$ user equipment; D=min(m, N) indicates the number of data streams send by the base station, that is degree of freedom of the system; N indicates the number of radio frequency links enabled by each user equipment; and $\sigma^2$ indicates noise power of each user equipment.

It can be known from formula (3) mentioned above that the number of the sub-carriers occupied by each user equipment, the number of the radio frequency links enabled by the base station and the transmitting power of the base station all affect user equipment throughput. Each user equipment has a requirement for the throughput respectively, and in this embodiment, the throughput of each user equipment is not smaller than the throughput threshold is taken as an example. In order to ensure that the throughput of each user equipment meets the throughput threshold of each user equipment, in this embodiment, formula (4) is taken as an optimization condition, and minimization of the total power consumption of the base station, that is, formula (5) is taken as an optimization goal. The number of sub-carriers occupied by each user equipment, the number of radio frequency links enabled by the base station and the transmitting power of the base station which are main factors for simultaneously affecting the throughput of each user equipment and the total power consumption of the base station are optimized to obtain the optimal number of the sub-carriers occupied by each user equipment, the optimal number of the radio frequency links enabled by the base station and the optimal transmitting power of the base station.

$$\Delta f k_i D \log_2\left(1 + \frac{\mu_i m N P_t}{K D^2 \sigma^2}\right) \geq R_i \quad (4)$$

$$\min_{m, \{k_i\}_{i=1}^I, P_t} P_t/\rho + m P_{rf} \quad (5)$$

where $R_i$ indicates the throughput threshold of the $i^{th}$ user equipment, and formula (4) indicates that the throughput of the $i^{th}$ user equipment is greater than or equal to the throughput threshold. Formula (5) indicates that the number m of the radio frequency links enabled by the base station, the number $k_i$ of the sub-carriers occupied by the $i^{th}$ user equipment and the transmitting power $P_t$ of the base station are optimized with the optimization goal of minimizing the total power consumption, where i=1, 2, . . . , I, that is to say, the number of the sub-carriers occupied by all the user equipments is optimized.

In addition, there are optimization conditions shown in formula (6), formula (7), formula (8) and formula (9) below besides the optimization condition shown in formula (4).

$$0 < P_t \leq P_{max} \quad (6)$$

$$0 < m \leq M \quad (7)$$

$$\sum_{i=1}^I k_i = K \quad (8)$$

$$k_i > 0, \quad (9)$$
$$i = 1, 2, \ldots, I$$

Where $P_{max}$ the maximal transmitting power of the base station, formula (6) is used for limiting the range of the transmitting power of the base station, M indicates the total number of the radio frequency links of the base station, formula (7) is used for limiting the range of the number of the radio frequency links enabled by the base station, and formula (8) and formula (9) are used for limiting the range of the number of the sub-carriers occupied by each user equipment.

Step 102, determining the total power consumption of the base station according to the optimal number of the sub-carriers occupied by each user equipment, the optimal number of the radio frequency links enabled by the base station and the optimal transmitting power of the base station obtained by optimization.

After obtaining the optimal number of the sub-carriers occupied by each user equipment, the optimal number of the radio frequency links enabled by the base station and the optimal transmitting power of the base station by optimization, the base station can determine the total power consumption thereof according to formula (2). Because the optimal number of the sub-carriers occupied by each user equipment, the optimal number of the radio frequency links enabled by the base station and the optimal transmitting power of the base station are obtained with the goal of minimizing the total power consumption of the base station, the total power consumption of the base station, calculated according to the optimal number of the radio frequency links enabled by the base station and the optimal transmitting power of the base station, is minimum, so as to reach the aim of saving the total power consumption of the base station and reduce power consumption of the downlink MIMO-OFDM system.

Further, after the base station obtains the optimal number of the sub-carriers occupied by each user equipment, the optimal number of the radio frequency links enabled by the base station and the optimal transmitting power of the base station, the base station completes processing of baseband OFDM signals through sub-carrier mapping according to the optimal number of the sub-carriers occupied by each user equipment, inverse Fourier transform of the mapped transmitting data, cyclic prefix (Cyclic Prefix, CP for short) addition of the inverse Fourier transform result, and transmits the processed digital signals to radio frequency ends (namely, transmits the processed digital signals to each radio frequency link enabled by the station). The base station controls the radio frequency links enabled by a radio frequency front end according to the obtained optimal number of the radio frequency links enabled by the base station, and adjusts a power amplifier in each enabled radio frequency link according to the optimal transmitting power of the base station, so as to control the transmitting power of each enabled radio frequency link and ensure that the summation of the transmitting powers of all the enabled radio frequency links is the optimal transmitting power of the base station. The enabled radio frequency link performs digital-to-analog conversion on an input digital signal to convert the digital signal into an analog signal and frequency mixing is performed on the analog signal, then the power amplifier performs power amplification on the mixing signal, and finally the radio frequency front end (or an antenna) transmits the power amplified signal to complete signal transmission.

The method and the base station for power determination provided by the embodiment perform joint optimization of the number of the sub-carriers occupied by each user equipment, the number of the radio frequency links enabled by the base station and the transmitting power of the base station with the optimization condition that throughput of each user equipment is not smaller than a throughput threshold and an optimization goal of minimizing total power consumption of the base station to obtain the optimal number of sub-carriers occupied by each user equipment, the optimal number of radio frequency links enabled by the base station and an optimal transmitting power of the base station, and the signals are transmitted on the basis of the obtained optimal number of the sub-carriers occupied by each user equipment, optimal number of the radio frequency links enabled by the base station and optimal transmitting power of the base station to ensure that the total power consumption of the base station can be minimum, and thus reduces the energy consumption of the downlink MIMO-OFDM system.

Figure 2A:
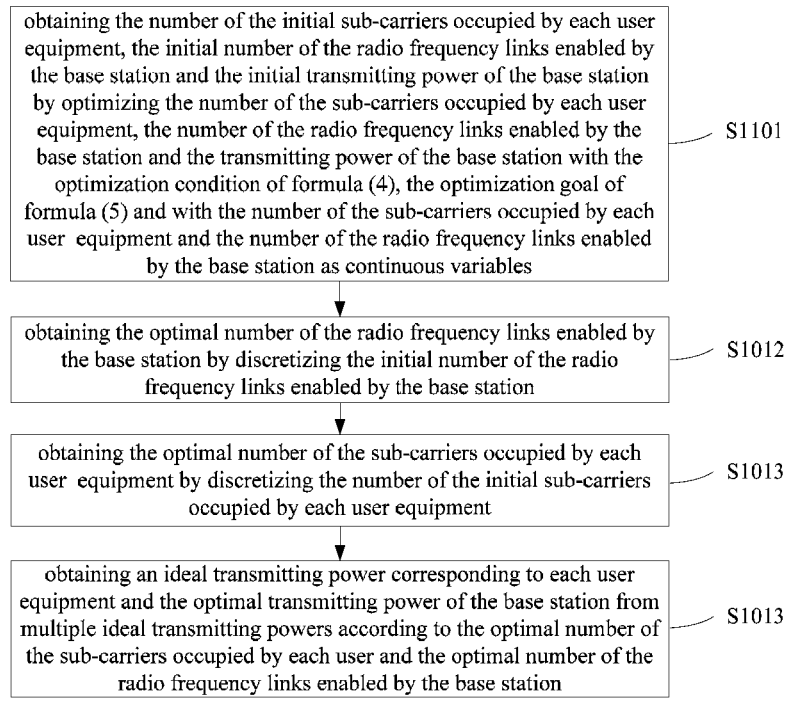
FIG. 2A is a flowchart of an implementation method of step 101 provided by an embodiment of the present invention.

FIG. 2A is a flowchart of an implementation method of step 101 provided by an embodiment of the present invention. As shown in FIG. 2A, the method of the embodiment comprises:

Step 1011, obtaining the number of the initial sub-carrier occupied by each user equipment, the initial number of the radio frequency links enabled by the base station and the initial transmitting power of the base station by optimizing the number of the sub-carriers occupied by each user equipment, the number of the radio frequency links enabled by the base station and the transmitting power of the base station with the optimization condition of formula (4), the optimization goal of formula (5) and with the number of the sub-carriers occupied by each user equipment and the number of the radio frequency links enabled by the base station as continuous variables.

Because the number of the radio frequency links enabled by the base station and the number of the sub-carriers occupied by each user equipment are integer variables and the transmitting power of the base station is a continuous variable, in order to facilitate optimization solution, the optimization solution is performed under the assumption that the number of the radio frequency links enabled by the base station and the number of the sub-carriers occupied by each user equipment are also continuous variables in the embodiment.

In addition, the solution is performed under two conditions according to the relation between m and N in the embodiment because D=min(m, N).

Firstly, for the condition of m≥N, the optimization problem of the embodiment belongs to a conventional one. A bisection method can be adopted for the optimization solution, namely, the number of the initial sub-carrier occupied by each user equipment, the initial number of the radio frequency links enabled by the base station and the initial transmitting power of the base station can be obtained, and under this condition, the number of the initial sub-carrier occupied by each user equipment, the initial number of the radio frequency links enabled by the base station and the initial transmitting power of the base station all have fixed expressions, as shown in formula (10), formula (11) and formula (12) respectively.

$$m^o = \begin{cases} \sqrt{\dfrac{\psi}{\rho P_{rf}}}, & \psi \le MP_{max} \text{ and } N_{eq} \le \sqrt{\dfrac{\psi}{\rho P_{rf}}} \le M \\ M, & \psi \le MP_{max} \text{ and } \sqrt{\dfrac{\psi}{\rho P_{rf}}} > M \\ N_{eq}, & \psi \le MP_{max} \text{ and } \sqrt{\dfrac{\psi}{\rho P_{rf}}} < N_{eq} \end{cases} \quad (10)$$

$$P_t^o = \dfrac{\psi}{m^o} \quad (11)$$

$$k_i = \dfrac{R_i}{\Delta fN \log_2\left(1 + \dfrac{\mu_i \psi}{KN\sigma^2}\right)} \quad (12)$$

where $k_i$ is the number of the initial sub-carrier occupied by the $i^{th}$ user equipment, $m^o$ is the initial number of the radio frequency links enabled by the base station, $P_t^o$ is the initial transmitting power of the base station, and $k_i$, $m^o$ and $P_t^o$ satisfy formula (13) and formula (14).

$$\sum_{i=1}^{I} \dfrac{R_i}{\Delta fN \log_2\left(1 + \dfrac{\mu_i \psi}{KN\sigma^2}\right)} = K \quad (13)$$

$$N_{eq} = \max\{\psi / P_{max}, N\} \quad (14)$$

where $\psi$ can be obtained by adopting a bisection method. The bisection method is a traditional algorithm, the basic idea of which is to continually halve the interval length of an optimal value of a variable in the iterative process till infinitely approximating the optimal value of the variable, and the embodiment performs the solution just based on this idea and obtains the results shown in formula (10), formula (11) and formula (12).

For the condition of m<N, the optimization problem of this embodiment belongs to a convex problem, so a high-efficiency interior point algorithm can be adopted for the optimization solution to obtain the number of the initial sub-carrier occupied by each user equipment, the initial number of the radio frequency links enabled by the base station and the initial transmitting power of the base station. Specifically, the convex problem under constraint condition is converted into an unconstraint convex problem by adopting a KKT (Karush-Kuhn-Tucker) condition, and then the unconstraint convex problem is solved by adopting a traditional solving method (such as a Newton method). Under this condition, fixed expressions of the number of the initial sub-carrier occupied by each user equipment, the initial number of the radio frequency links enabled by the base station and the initial transmitting power of the base station cannot be obtained, and only specific numerical points can be obtained.

Because the solution is performed by using the number of the sub-carriers occupied by each user equipment and the number of the radio frequency links enabled by the base station as continuous variables in this step, the obtained number of the initial sub-carrier occupied by each user equipment and initial number of the radio frequency links enabled by the base station are required to be further discretized, that is, the subsequent step 1012 and step 1013 are performed.

Step 1012, obtaining the optimal number of the radio frequency links enabled by the base station by discretizing the initial number of the radio frequency links enabled by the base station.

In this embodiment, the optimal number of the radio frequency links enabled by the base station is obtained by rounding up the initial number of the radio frequency links enabled by the base station, that is, the smallest integer greater than or equal to the initial number of the radio frequency links enabled by the base station is taken as the optimal number of the radio frequency links enabled by the base station. For example, supposing the initial number of the radio frequency links enabled by the base station, solved in the step 1011, is 3.1, the 3.1 is rounded up to 4, that is to say, the optimal number of the radio frequency links enabled by the base station is 4.

The implementation of discretizing the initial number of the radio frequency links enabled by the base station is not limited to the above-mentioned one. For example, the initial number of the radio frequency links enabled by the base station can also be rounded down, e.g. 3.1 is rounded down to 3, that is, the optimal number of the radio frequency links enabled by the base station is 3. For another example, the initial number of the radio frequency links enabled by the base station can be rounded off, e.g. 3.1 is rounded off to 3, that is, the optimal number of the radio frequency links enabled by the base station is 3. Rounding up is simple and feasible, and good performance can be obtained when the system adopts the number of the radio frequency links obtained in this mode, so it is a preferred implementation.

Step 1013, obtaining the optimal number of the sub-carriers occupied by each user equipment by discretizing the number of the initial sub-carrier occupied by each user equipment.

In this embodiment, the number of the initial sub-carrier occupied by each user equipment is first rounded down (namely, taking the integer part of the initial number of the sub-carriers) to the resulting number of the sub-carriers which are assigned to each user equipment. That is to say, the integer part of the number of the initial sub-carrier occupied by each user equipment is assigned to each user equipment. For example, supposing the number of the initial sub-carrier occupied by the $i^{th}$ user equipment is 2.6, 2.6 is rounded down to 2, namely, 2 sub-carriers are assigned to the $i^{th}$ user equipment, and the same processing is performed for other user equipments. The rounding down mode is adopted in this embodiment, and the rest part of the sub-carriers are not assigned to any user equipment after the sub-carriers are assigned according to the integer part of the initial number of the sub-carriers, so the unassigned sub-carriers are required to be further assigned. At this point, the throughput of each user equipment is calculated through formula (3) according to the optimal number of the radio frequency links enabled by the base station, the initial transmitting power of the base station and the current number of the sub-carriers assigned to each user equipment, and then the throughput threshold of each user equipment is subtracted from the throughput of each user equipment to obtain the difference between the throughput and the corresponding throughput threshold of each user equipment. Then, one of the undistributed sub-carriers is assigned to the user equipment with maximum difference between the throughput and the corresponding throughput threshold, and the difference between the throughput and the corresponding throughput threshold of each user equipment is obtained newly according to the optimal number of the radio frequency links enabled by the base station, the initial transmitting power of the base station, the current number of the sub-carriers assigned to each user equipment (the number of the sub-carriers of the user equipment with the maximum difference between the throughput and the corresponding throughput threshold has already been changed) and the throughput threshold of each user equipment till all the unassigned sub-carriers are assigned. Now discretization of the number of the initial sub-carrier occupied by each user equipment is completed, namely, the optimal number of the sub-carriers occupied by each user equipment is obtained.

The implementation of discretizing the number of the initial sub-carrier occupied by each user equipment is not limited to the above-mentioned one. This discretization method just can make the performance of the discretized sub-carriers approximately reach that of before the discretization, so it is a preferred implementation.

Step 1014, obtaining an ideal transmitting power corresponding to each user equipment and the optimal transmitting power of the base station from multiple ideal transmitting powers according to the optimal number of the sub-carriers occupied by each user equipment and the optimal number of the radio frequency links enabled by the base station.

Because the number of the sub-carriers occupied by each user equipment and the number of the radio frequency links enabled by the base station are changed from the number of the initial sub-carrier and the initial number of the radio frequency links to the optimal number of the sub-carriers and the optimal number of the radio frequency links respectively, the optimal transmitting power of the base station needs to be obtained by using the optimal number of the sub-carriers occupied by each user equipment and the optimal number of the radio frequency links enabled by the base station as conditions.

In this embodiment, first the ideal transmitting power corresponding to each user equipment is obtained according to the optimal number of the sub-carriers occupied by each user equipment, the throughput threshold of each user equipment and the optimal number of the radio frequency links enabled by the base station. Specifically, the ideal transmitting power corresponding to the $i^{th}$ user equipment can be obtained through formula (15).

$$P_{t,i} = \frac{KD^{*2}\sigma^2\left(2^{\frac{R_i}{\Delta f k_i^* D^*}} - 1\right)}{\mu m^* N} \tag{15}$$

where $P_{t,i}$ indicates the ideal transmitting power corresponding to the $i^{th}$ user equipment, $k^*_i$ indicates the optimal number of the sub-carriers occupied by the $i^{th}$ user equipment, $m^*$ indicates the optimal number of the radio frequency links enabled by the base station, and $D^*=\min(m^*, N)$. By comparing formula (15) with formula (3), it can be discovered that formula (15) is an alternative formula of formula (3), that is, the throughput of each user equipment is found according to the transmitting power in formula (3), and the corresponding transmitting power is found according to the throughput of each user equipment in formula (15).

When the ideal transmitting power corresponding to each user equipment is found, the ideal transmitting powers corresponding to all the user equipments are compared to obtain the maximum ideal transmitting power, and then the obtained maximum ideal transmitting power is used as the optimal transmitting power of the base station. When the obtained maximum ideal transmitting power is greater than the initial transmitting power of the base station, the initial transmitting power of the base station needs to be increased to obtain the optimal transmitting power of the base station; when the obtained maximum ideal transmitting power is less than the initial transmitting power of the base station, the initial transmitting power of the base station needs to be reduced to obtain the optimal transmitting power of the base station; and when the obtained maximum ideal transmitting power is equal to the initial transmitting power of the base station, the initial transmitting power of the base station is the optimal transmitting power of the base station.

From the above steps, the optimal number of the sub-carriers occupied by each user equipment, the optimal number of the radio frequency links enabled by the base station and the optimal transmitting power of the base station are finally obtained. The base station transmits data based on the obtained optimal number of the sub-carriers occupied by each user equipment, optimal number of the radio frequency links enabled by the base station and optimal transmitting power of the base station, which can minimize the total power consumption of the base station, reduce the energy consumption of the whole downlink MIMO-OFDM system, and make a contribution to construct the efficient and energy-saving communication system.

Figure 2B:
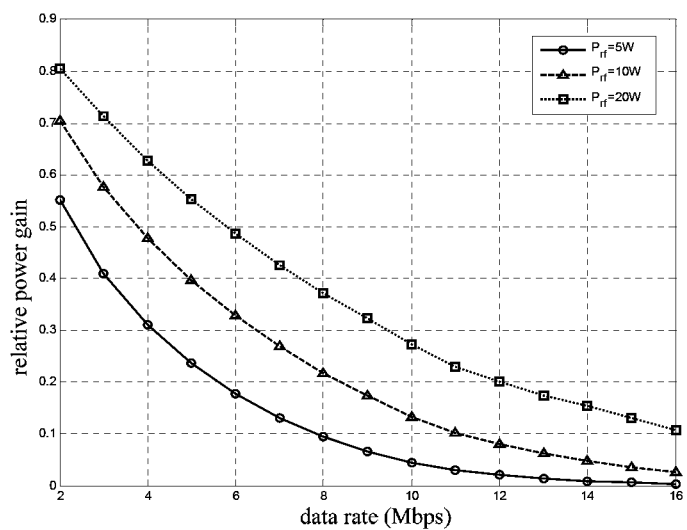
FIG. 2B is a comparison diagram of simulation results provided by an embodiment of the present invention.

In order to describe the beneficial effects produced by each embodiment of the present invention more intuitively, the inventor simultaneously performed simulation experiments on the technical solution of the present invention and the prior art in which all the radio frequency links are enabled, and obtained the total power consumption of the base station when the data are transmitted by adopting the technical solution of the present invention and that by adopting the prior art in which all the radio frequency links are enabled. A comparison diagram of simulation results obtained by processing the total power consumption of the base station under the two solutions is shown in FIG. 2B, wherein FIG. 2B shows power gains produced by the base station when the data are transmitted by adopting the technical solution of the present invention and the prior art in which all the radio frequency links are enabled. The horizontal coordinate is data rate (that is throughput) satisfying user equipments requirements, the unit is mega bits per second (Mbps), and the longitudinal coordinate is relative power gain. The relative power gain is equal to the ratio of the difference between the total power consumption of the base station of the prior art in which all the radio frequency links are enabled and that of technical solution of the present invention to the total power consumption of the base station of the prior art in which all the radio frequency links are enabled. In FIG. 2B, the relative power gains when the circuit power consumption $P_{rf}$ of each radio frequency link is 20 W, 15 W and 5 W respectively are shown sequentially from top to bottom. As shown in FIG. 2B, with the increase of the data rate satisfying user equipments requirements, relative power gain becomes smaller, which indicates that the lower the data rate satisfying user equipments requirements, the more obvious the power gain brought by the embodiments of the present invention is; and with the increase of the circuit power consumption of the radio frequency link, the relative power gain becomes bigger, which indicates that the greater the circuit power consumption of the radio frequency link, the more obvious the power gain brought by the embodiments of the present invention is.

Figure 3:
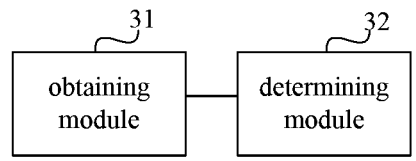
FIG. 3 is a schematic structural diagram of a base station provided by an embodiment of the present invention.

FIG. 3 is a schematic structural diagram of a base station provided by an embodiment of the present invention. As shown in FIG. 3, the base station of the embodiment comprises an obtaining module 31 and a determination module 32.

An obtaining module 31 is configured to obtain an optimal number of sub-carriers occupied by each user equipment, an optimal number of radio frequency links enabled by a base station and an optimal transmitting power of the base station by optimizing the number of the sub-carriers occupied by each user equipment, the number of the radio frequency links enabled by the base station and the transmitting power of the base station with an optimization condition that throughput of each user equipment is not smaller than a throughput threshold and an optimization goal of minimizing total power consumption of the base station. A determining module 32 connected with the obtaining module 31 is configured to determine the total power consumption of the base station according to the optimal number of the sub-carriers occupied by each user equipment, the optimal number of the radio frequency links enabled by the base station and the optimal transmitting power of the base station obtained by optimization.

Each functional module of the base station of the embodiment can be used for performing the process of the power determination method in FIG. 1, the specific working principle thereof will not be described redundantly, and refer to the embodiment of the method for details.

The base station of the embodiment performs joint optimization of the number of the sub-carriers occupied by each user equipment, the number of the radio frequency links enabled by the base station and the transmitting power of the base station with the optimization condition that throughput of each user equipment is not smaller than a throughput threshold and an optimization goal of minimizing total power consumption of the base station to obtain the optimal number of sub-carriers occupied by each user equipment, the optimal number of radio frequency links enabled by the base station and an optimal transmitting power of the base station, which minimizes the total power consumption of the base station determined by the optimal number of the sub-carriers occupied by each user equipment, the optimal number of the radio frequency links enabled by the base station and the optimal transmitting power of the base station, and thus reduces the energy consumption of the downlink MIMO-OFDM system.

Figure 4:
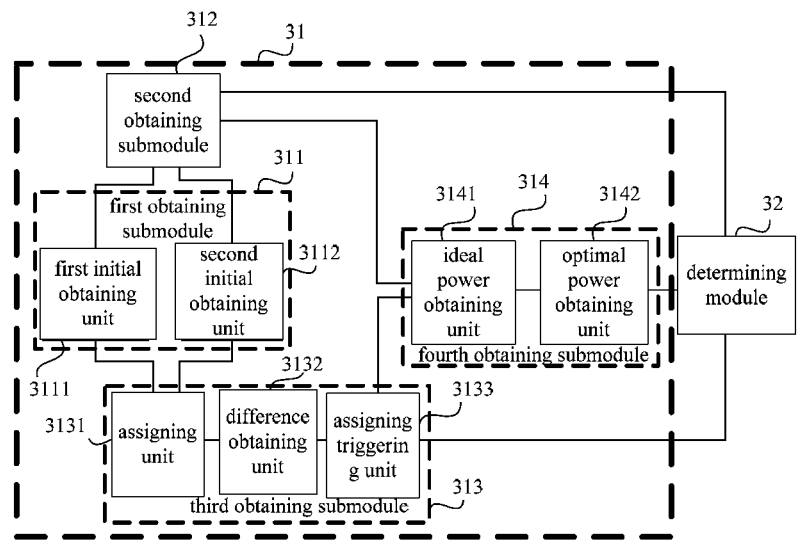
FIG. 4 is a schematic structural diagram of a base station provided by another embodiment of the present invention.

FIG. 4 is a schematic structural diagram of a base station provided by another embodiment of the present invention. This embodiment is realized on the basis of the embodiment shown in FIG. 3. As shown in FIG. 4, the obtaining module 31 of this embodiment comprises a first obtaining submodule 311, a second obtaining submodule 312, a third obtaining submodule 313 and a fourth obtaining submodule 314.

The first obtaining submodule 311 is configured to obtain the number of the initial sub-carrier occupied by each user equipment, the initial number of the radio frequency links enabled by the base station and the initial transmitting power of the base station by optimizing the number of the sub-carriers occupied by each user equipment, the number of the radio frequency links enabled by the base station and the transmitting power of the base station with the optimization condition of formula (4), the optimization goal of formula (5) and with the number of the sub-carriers occupied by each user equipment and the number of the radio frequency links enabled by the base station as continuous variables. The second obtaining submodule 312 connected with the first obtaining submodule 311 is configured to obtain the optimal number of the radio frequency links enabled by the base station by discretizing the initial number of the radio frequency links enabled by the base station. The third obtaining submodule 313 connected with the first obtaining submodule 311 is configured to obtain the optimal number of the sub-carriers occupied by each user equipment by discretizing the number of the initial sub-carrier occupied by each user equipment. The fourth obtaining submodule 314 connected with the second obtaining submodule 312 and the third obtaining submodule 313 is configured to obtain an ideal transmitting power corresponding to each user equipment and the optimal transmitting power of the base station from multiple ideal transmitting powers according to the optimal number of the sub-carriers occupied by each user equipment and the optimal number of the radio frequency links enabled by the base station. For formula (4) and formula (5), refer to the embodiment of the method for details.

The second obtaining submodule 312 is further configured to take the smallest integer greater than or equal to the initial number of the radio frequency links enabled by the base station as the optimal number of the radio frequency links enabled by the base station.

The third obtaining submodule 313 comprises an assigning unit 3131, a difference obtaining unit 3132 and a assigning triggering unit 3133. Specifically, the assigning unit 3131 connected with the first obtaining submodule 311 is configured to assign the integer part of the number of the initial sub-carrier occupied by each user equipment to each user equipment; the difference obtaining unit 3132 connected with the assigning unit 3131 is configured to obtain a difference between the throughput and the corresponding throughput threshold of each user equipment according to the optimal number of the radio frequency links enabled by the base station, the initial transmitting power of the base station, the current number of the sub-carriers assigned to each user equipment and the throughput threshold of each user equipment; and the assigning triggering unit 3133 connected with the difference obtaining unit 3132 is configured to assign one of the unassigned sub-carriers to a user equipment with maximum difference between the throughput and the corresponding throughput threshold, and trigger the difference obtaining unit 3132 to newly obtain the difference between the throughput and the corresponding throughput threshold of each user equipment according to the optimal number of the radio frequency links enabled by the base station, the initial transmitting power of the base station, the current number of the sub-carriers assigned to each user equipment and the throughput threshold of each user equipment till all the unassigned sub-carriers are assigned, so as to obtain the optimal number of the sub-carriers occupied by each user equipment.

The fourth obtaining submodule 314 comprises an ideal power obtaining unit 3141 and an optimal power obtaining unit 3142, wherein the ideal power obtaining unit 3141 connected with the second obtaining unit 312 and the assigning triggering unit 3133 is configured to obtain the ideal transmitting power corresponding to each user equipment according to formula (15), and the optimal power obtaining unit 3142 connected with the ideal power obtaining unit 3141 is configured to take the maximal one of the ideal transmitting powers corresponding to all the user equipments as the optimal transmitting power of the base station. For formula (15), refer to the embodiment of the above-mentioned method for details.

Further, the first obtaining submodule 311 comprises a first initial obtaining unit 3111 and a second initial obtaining unit 3112.

The first initial obtaining unit 3111 is configured to obtain the number of the initial sub-carrier occupied by each user equipment, the initial number of the radio frequency links enabled by the base station and the initial transmitting power of the base station by performing optimization solution with a bisection method when m≥N. The obtained number of the initial sub-carrier occupied by each user equipment, initial number of the radio frequency links enabled by the base station and initial transmitting power of the base station are as shown in formula (10), formula (11) and formula (12) respectively, and for formula (10), formula (11) and formula (12), refer to the embodiment of the above-mentioned method for details.

The second initial obtaining unit 3112 is configured to obtain the number of the initial sub-carrier occupied by each user equipment, the initial number of the radio frequency links enabled by the base station and the initial transmitting power of the base station by performing optimization solution with an interior point algorithm when m<N.

Each above-mentioned functional submodule or functional unit of the base station of the embodiment can be used for performing the corresponding process of the method for power determination shown in FIG. 1 or FIG. 2A, the specific working principle thereof will not be described redundantly, and refer to the embodiment of the method for details.

The base station of the embodiment finally obtains the optimal number of the sub-carriers occupied by each user equipment, the optimal number of the radio frequency links enabled by the base station and the optimal transmitting power of the base station through each above-mentioned functional submodule or unit, and then transmits data based on the obtained optimal number of the sub-carriers occupied by each user equipment, optimal number of the radio frequency links enabled by the base station and optimal transmitting power of the base station, which can minimize the total power consumption, reduce the energy consumption of the whole downlink MIMO-OFDM system, and make a contribution to construct the efficient and energy-saving communication system.

Figure 5A:
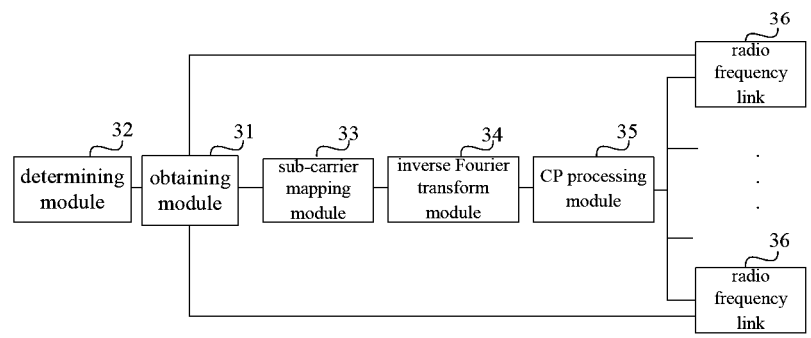
FIG. 5A is a schematic structural diagram of a base station provided by another embodiment of the present invention.
Figure 5B:
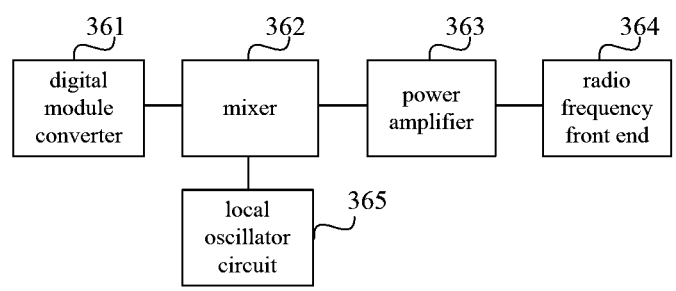
FIG. 5B is a schematic structural diagram of a radio frequency link provided by another embodiment of the present invention.

FIG. 5A is a schematic structural diagram of a base station provided by another embodiment of the present invention. FIG. 5B is a schematic structural diagram of a radio frequency link provided by another embodiment of the present invention. The embodiment is realized on the basis of the embodiment shown in FIG. 3, as shown in FIG. 5A, the base station of the embodiment comprises a sub-carrier mapping module 33, an inverse Fourier transform module 34, a CP processing module 35 and multiple radio frequency links 36 besides an obtaining module 31 and a determining module 32. As shown in FIG. 5B, each radio frequency link 36 comprises a digital module converter 361, a mixer 362, a power amplifier 363, a radio frequency front end 364 and a local oscillator circuit 365 for generating a local oscillator signal.

The obtaining module 31 connected with the sub-carrier mapping module 33 is configured to provide the optimal number of sub-carriers occupied by each user equipment for the sub-carrier mapping module 33. The obtaining module 31 connected with the multiple radio frequency links 36 is configured to control the enabling of the radio frequency links 36 according to the obtained optimal number of the radio frequency links which should be enabled, and supply the optimal transmitting power of the base station to each enabled radio frequency link 36, so as to control the transmitting power of each enabled radio frequency link 36.

The basic working principle of the base station is as follows: after obtaining the optimal number of sub-carriers occupied by each user equipment, the optimal number of radio frequency links enabled by the base station and the optimal transmitting power of the base station, the obtaining module 31 of the base station provide the optimal number of sub-carriers occupied by each user equipment for the sub-carrier mapping module 33, the sub-carrier mapping module 33 performs sub-carrier mapping according to the optimal number of the sub-carriers occupied by each user equipment and provides the mapped transmitting data to the inverse Fourier transform module 34, the inverse Fourier transform module 34 performs inverse Fourier transform of the mapped transmitting data and provides the processed data to the CP processing module 35, and the CP processing module 35 performs CP addition of the inverse Fourier transform result, to complete processing of baseband OFDM signals, and transmits the processed digital signals to f each radio frequency link 36 enabled by the base station. Each radio frequency link 36 is enabled under the control of the optimal number of the radio frequency links which should be enabled by the base station and are obtained by the obtaining module 31, and adjusts and determines the transmitting power of each own radio frequency link 36 according to the optimal transmitting power of the base station. Specifically, the digital module converter 361 performs digital-to-analog conversion on the input digital signals to convert the digital signal into analog signal, then the mixer 362 performs frequency mixing the analog signal by using the local oscillator signal provided by the local oscillator circuit 365, then the power amplifier 363 performs appropriate power amplification on the mixing signal according to the optimal transmitting power of the base station, and finally the radio frequency front end 364 transmits the amplified signal to complete signal transmission.

The base station of the embodiment finally obtains the optimal number of the sub-carriers occupied by each user equipment, the optimal number of the radio frequency links enabled by the base station and the optimal transmitting power of the base station through each above-mentioned functional submodule or unit, and then transmits data based on the obtained optimal number of the sub-carriers occupied by each user equipment, optimal number of the radio frequency links enabled by the base station and optimal transmitting power of the base station, which can minimize the total power consumption, reduce the energy consumption of the whole downlink MIMO-OFDM system, and make a contribution to construct the efficient and energy-saving communication system.

It should be appreciated for those of ordinary skill in the art that all or a part of the processes in the above-mentioned method embodiments may be implemented with hardware associated with program instructions which may be stored in a computer readable storage medium and performs the processes in the above-mentioned method embodiments when executed. The above-mentioned storage medium includes various medium that may store program codes, including such as a ROM, a RAM, a magnetic disk, an optical disk, or the like.

It is to be noted that the above embodiments are only some embodiments of the present invention without limit to the present invention. Although the embodiments of the present invention have been explained particularly with respect to the embodiments described above, those skilled in the art should understand that the technical solutions described in the embodiments described above may stilled be modified, or equivalently replaced with parts of the technical features thereof; and such modifications and replacements will not make the nature of the corresponding technical solutions depart from the spirit and scope of the embodiments of the present invention.

What is claimed is:

1. A method for power determination, comprising:
    obtaining an optimal number of sub-carriers occupied by each user equipment, an optimal number of radio frequency links enabled by a base station and an optimal transmitting power of the base station by optimizing a number of the sub-carriers occupied by each user equipment, a number of the radio frequency links enabled by the base station and a transmitting power of the base station with an optimization condition that throughput of each user equipment is not smaller than a throughput threshold and an optimization goal of minimizing total power consumption of the base station; and
    determining the total power consumption of the base station according to the optimal number of the sub-carriers occupied by each user equipment, the optimal number of the radio frequency links enabled by the base station and the optimal transmitting power of the base station obtained by optimization.

2. The method for power determination according to claim 1, wherein the obtaining the optimal number of sub-carriers occupied by each user equipment, the optimal number of radio frequency links enabled by the base station and the optimal transmitting power of the base station by optimizing the number of the sub-carriers occupied by each user equipment, the number of the radio frequency links enabled by the base station and the transmitting power of the base station with the optimization condition that the throughput of each user equipment is not smaller than the throughput threshold and the optimization goal of minimizing total power consumption of the base station comprises:
    obtaining a number of an initial sub-carrier occupied by each user equipment, an initial number of the radio frequency links enabled by the base station and initial transmitting power of the base station by optimizing the number of the sub-carriers occupied by each user equipment, the number of the radio frequency links enabled by the base station and the transmitting power of the base station with the optimization condition of formula $$\Delta f k_i D \log_2\left(1 + \frac{\mu_i m N P_t}{K D^2 \sigma^2}\right) \geq R_i,$$

the optimization goal of formula $$\min_{m, \{k_i\}_{i=1}^I, P_t} P_t/\rho + m P_{rf},$$

and with the number of the sub-carriers occupied by each user equipment and the number of the radio frequency links enabled by the base station as continuous variables; and
    obtaining the optimal number of the radio frequency links enabled by the base station by discretizing the initial number of the radio frequency links enabled by the base station;
    obtaining the optimal number of the sub-carriers occupied by each user equipment by discretizing the number of the initial sub-carrier occupied by each user equipment; and
    obtaining an ideal transmitting power corresponding to each user equipment and the optimal transmitting power of the base station from multiple ideal transmitting powers according to the optimal number of the sub-carriers occupied by each user equipment and the optimal number of the radio frequency links enabled by the base station,
    where $\Delta f$ indicates bandwidth of each sub-carrier, $k_i$ indicates the number of sub-carriers occupied by the $i^{th}$ user equipment, $$\sum_{i=1}^I k_i = K,$$

$k_i > 0$, $i=1, 2, \ldots, I$, I indicates a total number of user equipments, K indicates a total number of the sub-carriers, $\mu_i$ indicates large-scale channel gain of the $i^{th}$ user equipment, D=min(m, N) indicates the number of data streams send by the base station, N indicates the number of the radio frequency links enabled by each user equipment, m indicates the number of the radio frequency links enabled by the base station, $0<m\leq M$, M indicates the total number of the radio frequency links of the base station, $\sigma^2$ indicates noise power of each user equipment, $P_t$ indicates the transmitting power of the base station, $0<P_t\leq P_{max}$, $P_{max}$ indicates maximal transmitting power of the base station, $P_{rf}$ indicates circuit power consumption of each radio frequency link of the base station, $R_i$ indicates the throughput threshold of the $i^{th}$ user equipment, and $\rho$ indicates conversion efficiency of a power amplifier of the base station.

3. The method for power determination according to claim 2, wherein the obtaining the optimal number of the radio frequency links enabled by the base station by discretizing the initial number of the radio frequency links enabled by the base station comprises:
  taking the smallest integer greater than or equal to the initial number of the radio frequency links enabled by the base station as the optimal number of the radio frequency links enabled by the base station.

4. The method for power determination according to claim 2, wherein the obtaining the optimal number of the sub-carriers occupied by each user equipment by discretizing the number of the initial sub-carrier occupied by each user equipment comprises:
  assigning an integer part of the number of the initial sub-carrier occupied by each user equipment to each user equipment;
  obtaining a difference between the throughput and the corresponding throughput threshold of each user equipment according to the optimal number of the radio frequency links enabled by the base station, the initial transmitting power of the base station, the current number of the sub-carriers assigned to each user equipment and the throughput threshold of each user equipment; and
  assigning one of the unassigned sub-carriers to a user equipment with a maximum difference between the throughput and the corresponding throughput threshold, and newly obtaining the difference between the throughput and the corresponding throughput threshold of each user equipment according to the optimal number of the radio frequency links enabled by the base station, the initial transmitting power of the base station, the current number of the sub-carriers assigned to each user equipment and the throughput threshold of each user equipment till all the unassigned sub-carriers are assigned, so as to obtain the optimal number of the sub-carriers occupied by each user equipment.

5. The method for power determination according to claim 2, wherein the obtaining the ideal transmitting power corresponding to each user equipment and the optimal transmitting power of the base station from the multiple ideal transmitting powers according to the optimal number of the sub-carriers occupied by each user equipment and the optimal number of the radio frequency links enabled by the base station comprises:
  obtaining the ideal transmitting power corresponding to each user equipment according to formula $$P_{t,i} = \frac{KD^{*2}\sigma^2\left(2^{\frac{R_i}{\Delta f k_i^* D^*}} - 1\right)}{\mu m^* N};$$

and
  taking the maximal one of the ideal transmitting powers corresponding to all the user equipments as the optimal transmitting power of the base station,
  where $P_{t,i}$ indicates the ideal transmitting power corresponding to the $i^{th}$ user equipment;
  $k_i^*$ indicates the optimal number of the sub-carriers occupied by the $i^{th}$ user equipment; and
  $m^*$ indicates the optimal number of the radio frequency links enabled by the base station, and $D^*=\min(m^*, N)$.

6. The method for power determination according to claim 2, wherein the obtaining the number of the initial sub-carrier occupied by each user equipment, the initial number of the radio frequency links enabled by the base station and the initial transmitting power of the base station by optimizing the number of the sub-carriers occupied by each user equipment, the number of the radio frequency links enabled by the base station and the transmitting power of the base station with the optimization condition of formula $$\Delta f k_i D \log_2\left(1 + \frac{\mu_i m N P_t}{KD^2\sigma^2}\right) \geq R_i,$$

the optimization goal of formula $$\min_{m,\{k_i\}_{i=1}^I, P_t} P_t/\rho + mP_{rf},$$

and with the number of the sub-carriers occupied by each user equipment and the number of the radio frequency links enabled by the base station as continuous variables comprises:
  when $m \geq N$, obtaining $$m^o = \begin{cases} \sqrt{\frac{\psi}{\rho P_{rf}}}, & \psi \leq MP_{max} \text{ and } N_{eq} \leq \sqrt{\frac{\psi}{\rho P_{rf}}} \leq M \\ M, & \psi \leq MP_{max} \text{ and } \sqrt{\frac{\psi}{\rho P_{rf}}} > M \\ N_{eq}, & \psi \leq MP_{max} \text{ and } \sqrt{\frac{\psi}{\rho P_{rf}}} < N_{eq}, \end{cases}$$

$$P_t^o = \frac{\psi}{m^o}$$

and $$k_i = \frac{R_i}{\Delta f N \log_2\left(1 + \frac{\mu_i \psi}{KN\sigma^2}\right)}$$

by performing optimization solution with a bisection method,
  where $k_i$ is the number of the initial sub-carrier occupied by the $i^{th}$ user equipment, $m^o$ is the initial number of the radio frequency links enabled by the base station, $P_t^o$ is the initial transmitting power of the base station, $$\sum_{i=1}^{I} \frac{R_i}{\Delta f N \log_2\left(1 + \frac{\mu_i \psi}{KN\sigma^2}\right)} = K,$$

and $N_{eq} = \max\{\psi/P_{max}, N\}$; and when m<N, obtaining the number of the initial sub-carrier occupied by each user equipment, the initial number of the radio frequency links enabled by the base station and the initial transmitting power of the base station by performing the optimization solution with an interior point algorithm.

7. A base station, comprising:
   a processor; and
   a non-transitory computer readable storage medium storing programming for execution by the processor, the programming including instructions to:
   obtain an optimal number of sub-carriers occupied by each user equipment, an optimal number of radio frequency links enabled by the base station and an optimal transmitting power of the base station by optimizing a number of the sub-carriers occupied by each user equipment, a number of the radio frequency links enabled by the base station and a transmitting power of the base station with an optimization condition that throughput of each user equipment is not smaller than a throughput threshold and an optimization goal of minimizing total power consumption of the base station; and
   determine the total power consumption of the base station according to the optimal number of the sub-carriers occupied by each user equipment, the optimal number of the radio frequency links enabled by the base station and the optimal transmitting power of the base station obtained by optimization.

8. The base station according to claim 7, wherein the programming further including instructions to:
   obtain a number of an initial sub-carrier occupied by each user equipment, an initial number of the radio frequency links enabled by the base station and initial transmitting power of the base station by optimizing the number of the sub-carriers occupied by each user equipment, the number of the radio frequency links enabled by the base station and the transmitting power of the base station with the optimization condition of formula $$\Delta f k_i D \log_2\left(1 + \frac{\mu_i m N P_t}{KD^2\sigma^2}\right) \geq R_i,$$

the optimization goal of formula $$\min_{m,\{k_i\}_{i=1}^{I}, P_t} P_t/\rho + mP_{rf},$$

and with the number of the sub-carriers occupied by each user equipment and the number of the radio frequency links enabled by the base station as continuous variables;
   obtain the optimal number of the radio frequency links enabled by the base station by discretizing the initial number of the radio frequency links enabled by the base station;
   obtain the optimal number of the sub-carriers occupied by each user equipment by discretizing the number of the initial sub-carrier occupied by each user equipment; and
   obtain an ideal transmitting power corresponding to each user equipment and the optimal transmitting power of the base station from multiple ideal transmitting powers according to the optimal number of the sub-carriers occupied by each user equipment and the optimal number of the radio frequency links enabled by the base station, where $\Delta f$ indicates bandwidth of each sub-carrier, $k_i$ indicates the number of sub-carriers occupied by the $i^{th}$ user equipment, $$\sum_{i=1}^{I} k_i = K,$$

$k_i > 0$, $i=1, 2, \ldots, I$, I indicates the total number of user equipments, K indicates the total number of the sub-carriers, $\mu_i$ indicates large-scale channel gain of the $i^{th}$ user equipment, $D = \min(m, N)$ indicates the number of data streams send by the base station, N indicates the number of the radio frequency links enabled by each user equipment, m indicates the number of the radio frequency links enabled by the base station, $0 < m \geq M$, M indicates the total number of the radio frequency links of the base station, $\sigma^2$ indicates noise power of each user equipment, $P_t$ indicates the transmitting power of the base station, $0 < P_t \leq P_{max}$, $P_{max}$ indicates maximal transmitting power of the base station, $P_{rf}$ indicates circuit power consumption of each radio frequency link of the base station, $R_i$ indicates the throughput threshold of the $i^{th}$ user equipment, and $\rho$ indicates conversion efficiency of a power amplifier of the base station.

9. The base station according to claim 8, wherein the programming further including instructions to take the smallest integer greater than or equal to the initial number of the radio frequency links enabled by the base station as the optimal number of the radio frequency links enabled by the base station.

10. The base station according to claim 8, wherein the programming further including instructions to:
   assign the integer part of the number of the initial sub-carrier occupied by each user equipment to each user equipment;
   obtain a difference between the throughput and the corresponding throughput threshold of each user equipment according to the optimal number of the radio frequency links enabled by the base station, the initial transmitting power of the base station, the current number of the sub-carriers assigned to each user equipment and the throughput threshold of each user equipment; and
   assign one of unassigned sub-carriers to a user equipment with a maximum difference between the throughput and the corresponding throughput threshold, and trigger to newly obtain the difference between the throughput and the corresponding throughput threshold of each user equipment according to the optimal number of the radio frequency links enabled by the base station, the initial transmitting power of the base station, the current number of the sub-carriers assigned to each user equipment and the throughput threshold of each user equipment till all the unassigned sub-carriers are assigned, so as to obtain the optimal number of the sub-carriers occupied by each user equipment.

11. The base station according to claim 8, wherein the programming further including instructions to:
obtain the ideal transmitting power corresponding to each user equipment according to formula $$P_{t,i} = \frac{KD^{*2}\sigma^2\left(2^{\frac{R_i}{\Delta fk_i^* D^*}} - 1\right)}{\mu m^* N};$$

and
take the maximal one of the ideal transmitting powers corresponding to all the user equipments as the optimal transmitting power of the base station,
where $P_{t,i}$ indicates the ideal transmitting power corresponding to the $i^{th}$ user equipment;
$k_i^*$ indicates the optimal number of the sub-carriers occupied by the $i^{th}$ user equipment; and
$m^*$ indicates the optimal number of the radio frequency links enabled by the base station, and $D^*=\min(m^*, N)$.

12. The base station according to claim 8, wherein the programming further including instructions to:
obtain $$m^o = \begin{cases} \sqrt{\frac{\psi}{\rho P_{rf}}}, & \psi \leq MP_{max} \text{ and } N_{eq} \leq \sqrt{\frac{\psi}{\rho P_{rf}}} \leq M \\ M, & \psi \leq MP_{max} \text{ and } \sqrt{\frac{\psi}{\rho P_{rf}}} > M \\ N_{eq}, & \psi \leq MP_{max} \text{ and } \sqrt{\frac{\psi}{\rho P_{rf}}} < N_{eq}, \end{cases}$$

-continued $$P_t^o = \frac{\psi}{m^o} \text{ and}$$

$$k_i = \frac{R_i}{\Delta f N \log_2\left(1 + \frac{\mu_i \psi}{KN\sigma^2}\right)}$$

by performing an optimization solution with a bisection method when $m \geq N$,
where $k_i$ is the number of the initial sub-carrier occupied by the $i^{th}$ user equipment, $m^o$ is the initial number of the radio frequency links enabled by the base station, $P_t^o$ is the initial transmitting power of the base station, $$\sum_{i=1}^{I} \frac{R_i}{\Delta f N \log_2\left(1 + \frac{\mu_i \psi}{KN\sigma^2}\right)} = K,$$

and $N_{eq} = \max\{\psi/P_{max}, N\}$; and
obtain the number of the initial sub-carrier occupied by each user equipment, the initial number of the radio frequency links enabled by the base station and the initial transmitting power of the base station by performing the optimization solution with an interior point algorithm when $m < N$.

* * * * *